US006182483B1

(12) United States Patent
von Kathen et al.

(10) Patent No.: US 6,182,483 B1
(45) Date of Patent: Feb. 6, 2001

(54) LEVER LOCK

(75) Inventors: Achim von Kathen, Wuppertal; Gerd Sawatzki, Datteln, both of (DE)

(73) Assignee: EMKA Beschlagteile GmbH & Co. KG (DE)

( * ) Notice: Under 35 U.S.C. 154(b), the term of this patent shall be extended for 0 days.

(21) Appl. No.: 09/402,134

(22) PCT Filed: Mar. 27, 1998

(86) PCT No.: PCT/DE98/00911

§ 371 Date: Jan. 24, 2000

§ 102(e) Date: Jan. 24, 2000

(87) PCT Pub. No.: WO98/42938

PCT Pub. Date: Oct. 1, 1998

(30) Foreign Application Priority Data

Mar. 27, 1997 (DE) ............................................ 197 13 024

(51) Int. Cl.[7] ................................................ B60R 25/02

(52) U.S. Cl. ........................... 70/208; 70/215; 292/336.3

(58) Field of Search ................................ 70/95, 99, 100, 70/208, 120, 215, 462; 292/39, 336.3

(56) References Cited

U.S. PATENT DOCUMENTS

| | | | | |
|---|---|---|---|---|
| 4,231,597 | * | 11/1980 | Pelcin | 70/208 X |
| 4,554,807 | | 11/1985 | Dolejs | 70/208 |
| 4,631,937 | * | 12/1986 | Debus et al. | 70/208 X |
| 4,650,230 | * | 3/1987 | Takasaki | 70/208 X |
| 5,347,834 | * | 9/1994 | Ramsauer | 70/208 X |
| 5,685,181 | * | 11/1997 | Ramsauer | 70/208 |
| 5,722,269 | * | 3/1998 | Simon et al. | 70/208 |
| 5,873,274 | * | 2/1999 | Sauerland | 70/208 |
| 5,970,757 | * | 10/1999 | Ramsauer | 70/208 |

FOREIGN PATENT DOCUMENTS

| | | |
|---|---|---|
| 2 417 403 | 11/1994 | (DE) . |
| 297 05 508 U | 6/1997 | (DE) . |
| 0 261 266 | 3/1988 | (EP) . |
| 2 271 606 | 4/1994 | (GB) . |

* cited by examiner

*Primary Examiner*—Suzanne Dino Barrett
(74) *Attorney, Agent, or Firm*—Robert W. Becker & Associates

(57) ABSTRACT

A retractable lock for doors is provided that includes a frame mountable on the front side of the door panel for receiving a retractable lever grip. The lever grip is moveable along a release path between a retracted position inside the frame, where it is secured by a locking device, and an actuating position outside the frame. Further rotation of the lever grip along an actuating path transmits into rotational movement of a pinion which drives a locking rod, which is longitudinally slidably guided at the inner side of the door panel by engagement of outer teeth of the pinion at cutouts of the rod.

11 Claims, 2 Drawing Sheets

LEVER LOCK

BACKGROUND OF THE DESCRIPTION

The invention relates to a retractable lock for doors, in particular of thin-walled switching cabinets, with a frame mountable on the front side of the door panel and designed for receiving the retractable lever grip, wherein the lever grip in the folded position inside the frame can be secured by a locking device and can be folded along a release path from the retracted position into an actuating position outside of the frame. The further rotation of the lever grip along an actuating path is transmitted into the rotational movement of a pinion which drives a locking rod, which is longitudinally slidably guided at the inner side of the door panel, by engagement of the outer toothing of the pinion at cutouts of the rod.

A pivot lever lock with the aforementioned features is disclosed in European Patent Document 0 261 266. In such locking devices coupled to at least one locking rod, a lock box with a pinion arranged in a plane parallel to the door blade is provided for driving the locking rod at the inner side of the door. The locking rod extends through the lock box so that the engagement of the pinion with outer toothing in the cutouts of the rod takes place in the lock box. The pivot lever which can be retracted into the frame engages with its actuating shaft at the inner side of the door blade the bearing bore of the pinion in the lock box, for driving the pinion, is thus pivotable along its actuating path also in a plane parallel to the door panel. For this purpose, the pivot lever can be folded from its retracted position inside the frame along the release path out of the frame into its actuating position.

The known configuration of such a retractable lock has the disadvantage that the required lock box for embodying the rod drive requires an additional manufacturing and mounting expenditure. The position of the lock box and of the pinion arranged therein requires the pivoting of the pivot lever along an actuating path in a plane which is parallel to the door panel. Since at the same time the pivot lever must be moveable along a release path between the retracted position in the frame and the actuating position in which it is folded out of the frame, different support actions of the pivot lever are required which can be realized only with complex means.

It is therefore an object of the invention to simplify a retractable lock of the aforementioned kind with respect to manufacture and assembly.

SUMMARY OF THE INVENTION

The solution to this object, including advantageous embodiments and further developments of the invention results, from the contents of the claims which follow this description.

The principle idea of the invention suggests that the actuating path of the lever grip is positioned in a plane perpendicular to the door panel and that the pinion engaging the cutouts of the locking rod is supported on the bearing axle of the lever grip and is directly coupled under formation of a free-wheeling travel bridging the release path of the lever grip to the rotational movement of the lever grip. The invention has the advantage that the pinion which extends perpendicularly to the plane of the door panel engages directly the rod cutouts so that a separate lock box can be completely eliminated. Since the lever grip can be rotated only in one direction along the sequentially arranged release path and the actuating path, the support of the lever grip in the frame is simplified. Only one single bearing axle is provided which supports or connects the frame, the rotary grip, and the pinion. Due to the constant engagement of the pinion in the rod cutouts and because of the free-wheeling travel between the pinion and the lever grip, the free-wheeling travel does not cause any loss with respect to the actuating path for the rod drive and thus only serves to embody the release path for the lever grip between its retracted and unfolded positions.

According to one embodiment of the invention, it is suggested that for designing the free-wheeling travel of the pinion a slotted hole is provided and that the lever grip comprises a pin engaging the slotted hole of the pinion and moveable within the slotted hole. As an alternative, the free-wheeling travel between the lever grip and the pinion can also be designed in the area of the common bearing axle. On contacting rotary surfaces of lever grip and pinion corresponding rotary stops are provided which affect the follower action subsequent to the release position of the lever grip.

In order to facilitate the unfolding of the lever grip from its retracted position into the position in which it is folded out for actuation, it may be provided that the lever grip is supported relative to the pinion by a spring that pretensions the lever grip into the release position in which it is folded out of the frame. According to one embodiment of the invention, a side of the pinion facing away from the door panel can have a flattened portion against which the pressure spring positioned in a blind bore of the lever grip can rest. In the retracted position of the lever grip, this spring pretension at the same time provides a loading of the pinion into the locking position of the locking rod so that the locking rod is accordingly secured.

In order to ensure a safe engagement between the pinion and the locking rod, according to one embodiment a rod guide is arranged directly adjacent to the pinion wherein expediently the rod guide is arranged substantially centrally to the longitudinal extension of the lever grip in its retracted position. This rod guide can be screwed onto the frame by penetrating the door panel. The rod guide can also be a unitary part of the frame.

Finally, according to one embodiment of the invention, it can be provided that for covering the locking device arranged in the frame a sliding cover is provided in the form of a U-shaped hollow body which is securely and slidably mounted to the frame and which for releasing the locking device can be moved in the longitudinal direction of the frame in a direction away from the lever grip while being supported on the door panel.

BRIEF DESCRIPTION OF THE DRAWINGS

In the drawing one embodiment of the invention is represented which will be explained in the following. It is shown in.

DESCRIPTION OF PREFERRED EMBODIMENTS

Figure 1:
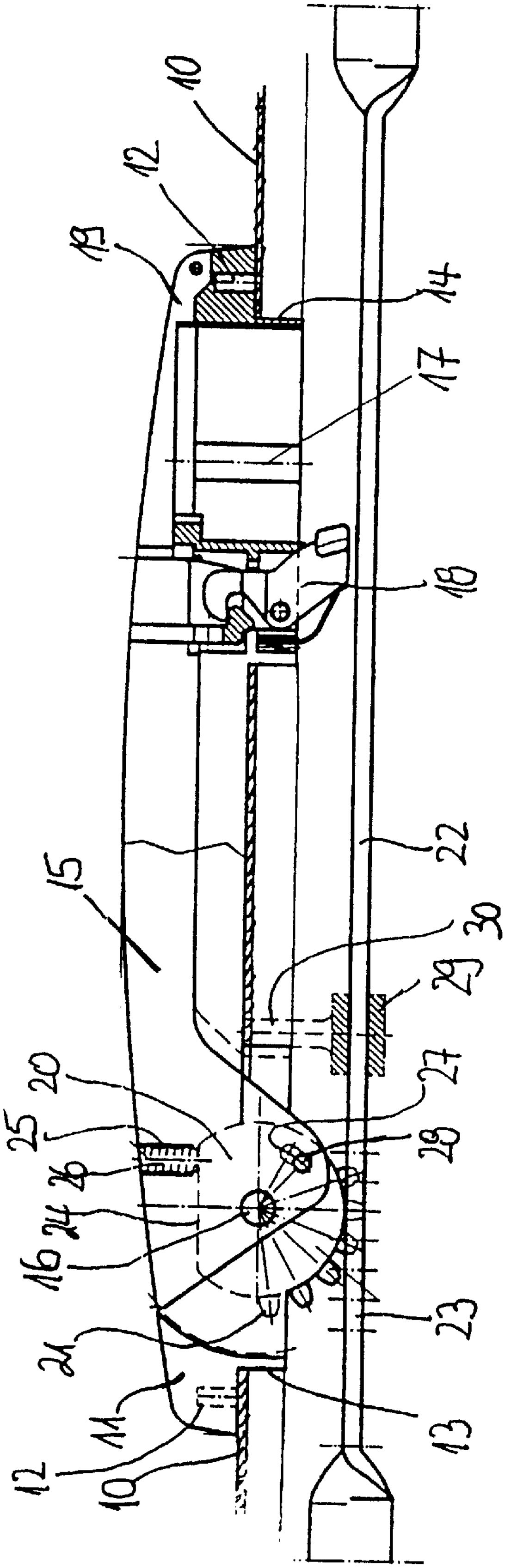
FIG. 1 a retractable lock in a side view mounted on a door panel, partially shown in section, with the lever grip in the retracted position.

On the exterior side of a door panel 10 a frame 11 is fastened with fastening means 12. The frame 11 penetrates the door panel with an upper projection 13 and a lower projection 14.

In the area of the upper projection 13 of the frame 11 a lever grip 15 is rotatably supported on a bearing axle 16 within the frame 1 1 such that a rotary movement of the lever grip 15 is possible in a plane which is perpendicular to the door panel 10.

In the area of the lower projection 14 of the frame 11 a locking device 17 is provided which is not shown in detail in the drawing. It acts on a lock 18 arranged in the frame 11 and acting on the lever grip 15 so that the lever grip 15 in the retracted position can be secured by the locking device 17. The locking device 17 is covered by a sliding cover 19 which is slidably guided on the frame 11 so as to be non-detachable and which is embodied as a U-shaped hollow body. For releasing the locking device 17, the cover is moved in the longitudinal direction of the frame, i.e., in a direction away from the lever grip 15 and is supported on the exterior of the door panel 10 when being moved.

A pinion 20 with an outer toothing 21 is rotatably supported on the bearing axle 16 that supports the lever grip 15 in the frame 11 and is moveable in a direction perpendicular to the door blade 10. The outer toothing 21 engages rod cutouts 23 of a longitudinally slidably arranged locking rod 22. A side of the pinion 20 facing away from the door panel 10 has a flattened portion 24 against which a pressure spring 26 rests which is mounted in a blind bore 25 of the lever grip 15 so that a pretension biasing the lever grip 15 from the retracted position (FIG. 1) into the actuating position (FIG. 2) when the grip lever 15 is released via the locking device 17, respectively, the lock 18 from the frame 11.

The lever grip 15 and the pinion 20 are coupled to one another by a free-wheeling travel in their rotary movement perpendicular to the door panel 10 for which purpose the pinion 20 has a slotted hole 27 and the lever grip 15 has a pin 28 engaging the slotted hole 27.

Figure 2:
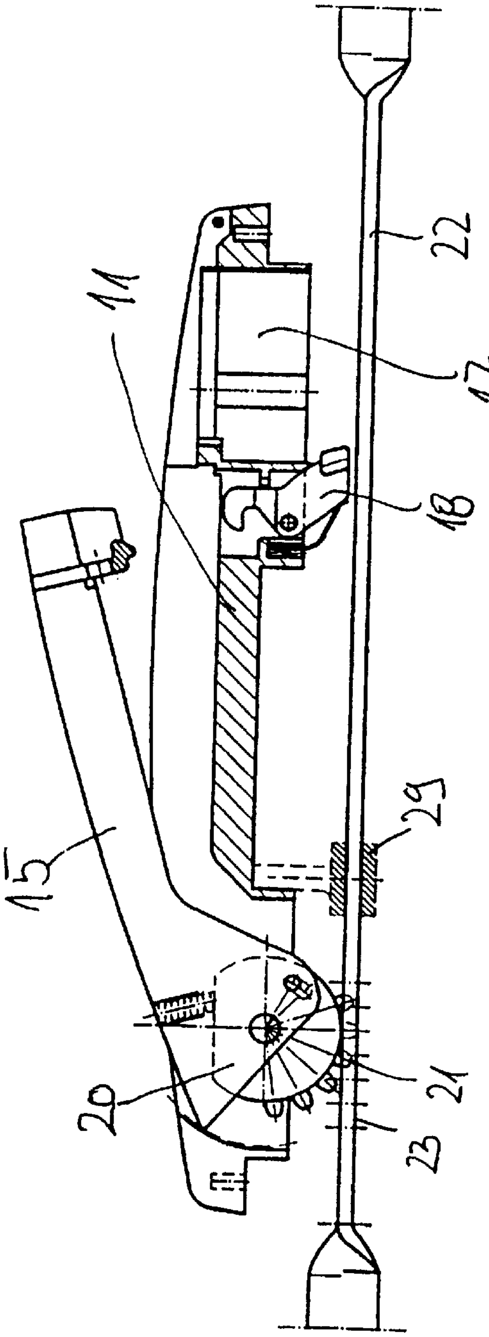
FIG. 2 the object of FIG. 1 in the actuating position in which the lever grip is folded out of the frame.
Figure 3:
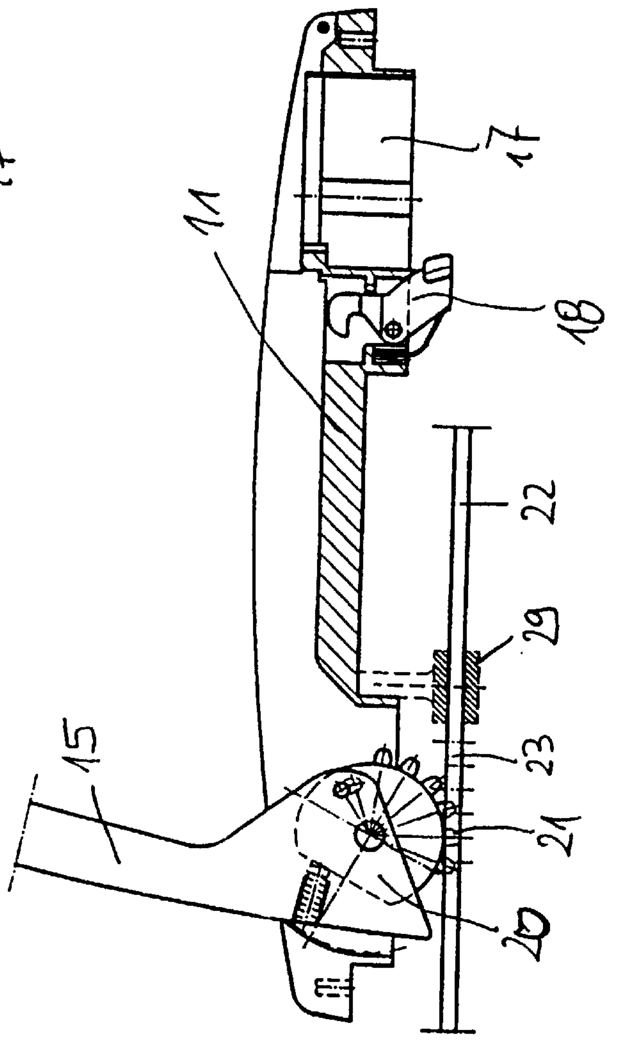
FIG. 3 the object of FIGS. 1 and 2 in a position of the lever grip at the end of the actuating path.

As can be seen in FIGS. 1 through 3, the pin 28 in the retracted position of the lever grip 15 is positioned at the end of the slotted hole 27 which faces the locking rod 22. When the lever grip 15 is released from the frame 11 via the locking device 17, the pressure spring 26 will ensure the movement of the lever grip 15 out of the frame 11 while the pinion position is first unchanged, the pin 28 connected to the lever grip 15 being moved to the end of the slotted hole 27 facing away from the locking rod 27. A further rotation of the lever group 15 along an actuating path now entrains the pinion 20 by abutment of the pin 28 at the correlated end of the slotted hole 27 so that the pinion is rotated with the rotation of the lever grip 15 and thus drives the locking rod 22.

The movement steps for locking the lever grip 15 are carried out in reverse, wherein at the beginning of the locking movement the free-wheeling travel provided by the slotted hole 27 at the pinion 20 is overcome so that subsequently thereto, until the retracted position of the lever grip 15 is reached, the lever grip 15 upon rotation entrains via the actuating path and the free-wheeling travel the pinion 20 and thus the locking rod 22 into its locking position.

Figure 4:
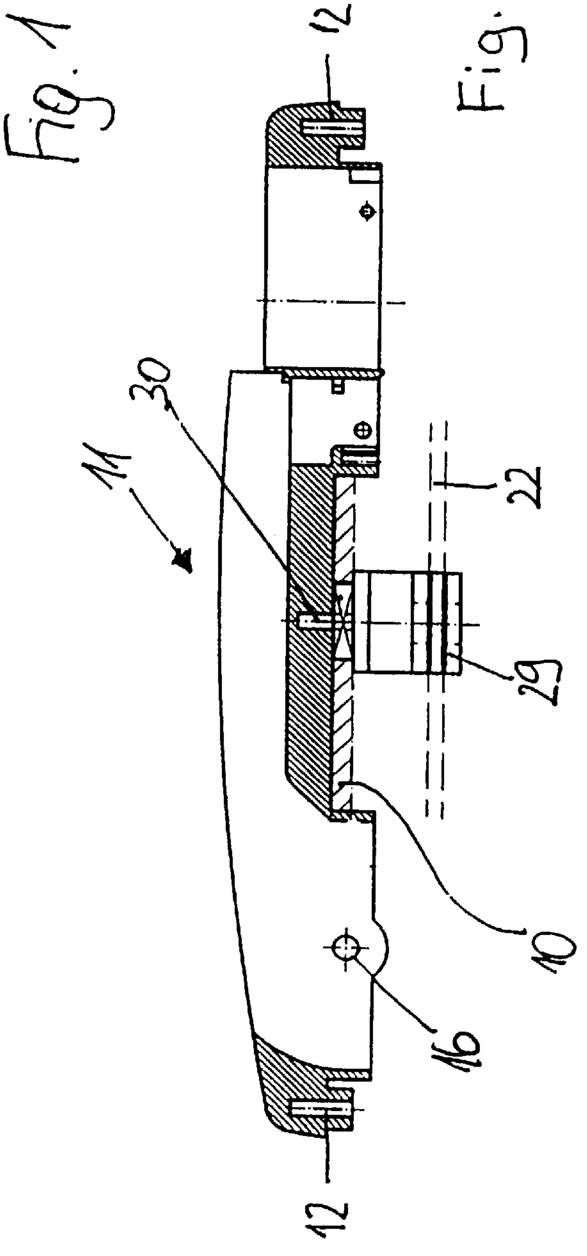
FIG. 4 a frame as a component of the lock shown in FIGS. 1 through 3, including the rod guide mounted thereat, in an individual representation.

In order to ensure safe engagement of the outer toothing 21 of the pinion 20 at the rod cutouts 23 of the locking rod 22, a rod guide 29 is provided directly adjacent to the pinion 20. It is schematically represented in FIGS. 1 through 3. According to the embodiment shown in FIG. 4, it is mounted at the frame 11 with a fastening means 30 that penetrates the door panel 10.

The features disclosed in the above description, the claims, the abstract, and the drawing of the object of these documents can be important individually as well as in any suitable combination with one another for the realization of the invention in its various embodiments.

The specification incorporates by reference the disclosure of German priority document 19 7 13 024.0 of Mar. 27 1997 and International Patent Application priority document PCT/DE98/00911 of Mar. 27 1998.

The present invention is, of course, in no way restricted to the specific disclosure of the specification and drawings, but also encompasses any modifications within the scope of the appended claims.

What is claimed is:

1. A retractable lock for doors of switching cabinets, comprising:

a frame mounted on a front side of a door panel;

a lever grip movable between a retracted position in said frame and an actuating position out of said frame, said actuating path of said lever grip positioned in a plane perpendicular to said door panel;

a locking device for securing said lever grip in the retracted position in said frame;

a locking rod mounted at an inner side of a door blade and having a plurality of cutouts;

a pinion for longitudinally guiding said locking rod by engagement of outer teeth of said pinion with said cutouts upon further rotation of said lever grip along said actuating path, said pinion supported on a bearing axle of said lever grip in said door frame and coupled directly to the rotary movement of said lever grip under formation of a free-wheeling travel of said lever grip.

2. A retractable lock according to claim 1, wherein said pinion has a slotted hole and said lever grip has a pin for movably engaging said slotted hole to provide for said free-wheeling travel of said lever grip.

3. A retractable lock according to claim 1, wherein said free-wheeling travel between said lever grip and said pinion is provided in the area of the common bearing axle through correlated rotary stops.

4. A retractable lock according to claim 1, wherein said lever grip is supported relative to said pinion by a spring pretensioning said lever grip into a release position in which said lever grip is folded out of said frame.

5. A retractable lock according to claim 4, wherein said pinion has a flattened portion at a side thereof facing away from said door panel, said pressure spring supported at said flattened portion and positioned in a blind bore in said lever grip.

6. A retractable lock according to claim 1, further comprising a rod guide position directly adjacent to said pinion.

7. A retractable lock according to claim 6, wherein said rod guide is arranged substantially centrally relative to the longitudinal extension of said lever grip in the retracted position in said frame.

8. A retractable lock according to claim 7, wherein said rod guide is fastened to said frame on an exterior side of said door panel.

9. A retractable lock according to claim 8, wherein said rod guide is screwed to said frame.

10. A retractable lock according to claim 8, wherein said rod guide is a unitary part of said frame.

11. A retractable lock according to claim 1, further comprising a sliding cover for covering said locking device in said frame, said sliding cover comprising a U-shaped hollow body slidably connected to said frame and moveable for releasing said locking device in a longitudinal direction of said frame in a direction away from said lever grip while being supported on said door panel.

* * * * *